United States Patent Office 3,278,513
Patented Oct. 11, 1966

3,278,513
PRODUCTION OF EMULSIFIABLE WAXES
Michael Jahrstorfer, Heidelberg, Karl Schmeidl, Frankenthal, Pfalz, Gerhard Staiger, Ludwigshafen (Rhine), and Ludwig Vogel, Frankenthal, Pfalz, Germany, assignors to Badische Anilin- & Soda-Fabrik Aktiengesellschaft, Ludwigshafen (Rhine), Germany
No Drawing. Filed Dec. 17, 1962, Ser. No. 244,951
Claims priority, application Germany, Dec. 21, 1961, B 65,285; Nov. 13, 1962, B 69,600
2 Claims. (Cl. 260—94.9)

This invention relates to a new process for the production of new readily emulsifiable waxes by oxidation of polyolefines having molecular weights of between 1000 and 50,000.

It is known to oxidize polyolefines with oxygen or oxygen-containing gases. Different types of product are obtained depending on the conditions used. According to German patent specification No. 818,427, the action of air on molten polyethylene at temperatures of about 160° C. gives products which have a much higher melt viscosity than the initial material. According to another process, the increase in the viscosity can be controlled during the oxidation of polyethylene having molecular weights between 1000 and 8000 by carrying out the oxidation at a temperature which is as little above the melting point of polyethylene as possible. Powerful agitation while simultaneously passing in more than 2 to 3 liters of oxygen per kilogram of polyethylene per hour has a similar effect. However, only up to 0.6 kg. of oxygen is absorbed per 100 kg. of polyethylene per hour, and at temperatures above 130° C., this method is ineffective.

It is an object of this invention to prepare high quality readily emulsifiable waxes based on polyolefines. It is another object of the invention to prepare by oxidation, waxes whose melt viscosity is lower than that of the unoxidized initial material.

In the oxidation of molten polyolefines whose molecular weight is between 1000 and 50,000 at increased pressure and temperatures between 130° and 250° C. with oxygen or oxygen-containing gases with agitation these and further objects are achieved by continuing the oxidation until each 100 kg. of the polyolefine has chemically absorbed from 0.5 to 10 kg. of oxygen and by carrying out the oxidation with intense stirring with an agitator output of 1 to 15 kilowatts per 100 kg. of polyolefine.

A particular advantage of this process is that the rate of oxidation is about three times higher than by the prior art methods. Coemployment of oxidation catalysts is not usually necessary.

Polyethylene which has been prepared by conventional high pressure or low pressure polymerization methods is suitable as the initial material. Especially suitable polyethylenes are those which have been prepared at elevated temperature, if desired in the presence of catalysts, by thermal degradation of low pressure polyethylenes or preferably high pressure polyethylenes having molecular weights above about 20,000, and generally above 50,000, and which have molecular weights between 3000 and 10,000.

Other suitable initial materials are for example homopolymers having average molecular weights between 1000 and 50,000 derived from 1-butylene, isobutylene and propylene, copolymers of these monomers and ethylene as further comonomer, and also mixtures of the said polymers with each other and with polyethylene. Among these polymers, that polypropylene is especially worthy of mention which is obtainable by thermal degradation of high molecular weight polypropylene and which has a density of at least 0.90.

Copolymers of ethylene and carbon monoxide which contain one to three carbonyl groups in the chain for fifty ethylene groups are also suitable for the process according to this invention. These copolymers are obtainable by conventional methods and are intended to be included within the term "polyolefines" as used in the present specification.

When using air as the oxygen-containing gas, i.e., the oxidizing agent, it is usual to apply pressures between 2 and 20 atmospheres, preferably between 5 and 15 atmospheres. When using oxygen, pressures of about 1.5 to 5, preferably 2 to 3, atmospheres are sufficient. Oxidation is carried out at temperatures between 130° and 250° C.; temperatures between 140° and 170° C. are particularly preferred for polyethylene.

Conventional mixing or agitating means, such as flat-blade paddle agitators, propeller mixers and screw mixers are suitable for the process. It is advantageous to use turbine-type mixers. Depending on the height of the reactor, one or more than one of these mixers may be used, preferably arranged vertically.

The ratio of the diameter of the reactor to the total diameter of the mixer has particular effect on the color of the wax obtained for a given supply of energy. This ratio is advantageously between 6:5 and 12.5:5. A ratio between 7:5 and 2:1 is preferred because waxes having particularly slight coloration are thereby obtained.

The melt viscosity continually decreases during the oxidation in the process according to this invention. The products of the process may readily be emulsified in water using the conventional ionic emulsifiers, such as morpholine and 3-methoxypropylamine, and they form very stable emulsions. A further advantage of the waxes prepared according to this invention is that they may be emulsified even with non-ionic dispersing agents. They are suitable for the production of dry-bright wax emulsions and floor polishes.

If polyolefines are oxidized, not by the process according to the invention, but with an agitator output of less than 1 kw. per 100 kg., the melt viscosity increases during the oxidation. In the oxidation of 100 kg. of thermally degraded high pressure polyethylene having the molecular weight 5500 and the melt viscosity 950 centistokes at 140° to 170° C. and 10 atmospheres pressure, the melt viscosity rises to 1400 centistokes if the reaction is carried out with an agitator output of 0.8 kw./100 kg. up to an oxygen absorption of 6 kg.

If the same initial material be oxidized with oxygen at normal pressure with still lower supply of mechanical work by the stirrer up to an acid value of about 30, elastic products are obtained having gelatinous character. Such waxes cannot be emulsified in water using the conventional emulsifiers; moreover the rate of oxidation is at the most only half as high.

The following examples further illustrate the invention. Electrical output in kilowatts transmitted by the agitator as mechanical work to the molten polyethylene per hour, is referred in each case to 100 kg. of polyethylene. The figures give the electrical power consumption of the agitator motors times the efficiency of the motors less the power losses by friction at the shafts and seals. The melt viscosities given in the examples are measured at 120° C. (unless otherwise specified) according to Ubbelohde ("Oel und Kohle," 12, 949 (1936)).

*Examples 1 to 4*

4 kg. of polyethylene which has the molecular weight 5,500 and the melt viscosity 950 cst. and has been prepared in the conventional way by thermal degradation of high pressure polyethylene is placed in a 10-l. pressure vessel of corrosion-resistant steel which is fitted with baffles, turbine impeller, cooler and water separator. The ratio of the free diameter of the pressure vessel to the diameter of the turbine impeller used, which has six impeller blades, is 20:13. The whole is heated to 145° C. and, while stirring (450 r.p.m.), 1500 liters (measured at standard pressure and 20° C.) of air is led per hour under a pressure of 11 atmospheres into the molten polyethylene. Reaction sets in after a few minutes. Stirring is continued for three hours at about 145° C. with an agitator output of 1 kw./100 kg. A total of 0.24 kg. of oxygen is absorbed. A practically colorless wax is obtained as reaction product; it melts at 95° to 97° C., has the acid number 25.2 and the melt viscosity 488 centistokes.

By working under the same conditions but oxidizing for 3⅔ or 7¼ or 8½ hours, the total amount of oxygen absorbed is 0.28, 0.59 or 0.83 kg. of oxygen, and a wax is obtained which has the acid number 40, 61.6 or 82.6, the melting point 94° to 96° C., 72° to 74° C. or 84° to 86° C., and the melt viscosities 455, 213.5 or 155 centistokes.

*Example 5*

50 kg. of polyethylene having the properties specified in Examples 1 to 4 is heated to 160° C. in a 100-l. pressure vessel fitted with a turbine impeller, baffles, cooler and water separator. The turbine impeller has six blades and the ratio of the free diameter of the pressure vessel to the diameter of the impeller is 356:160. The polyethylene melt obtained is oxidized at an impeller speed of 900 r.p.m. and a pressure of 10 atmospheres for 3½ hours, 9000 liters (measured at standard pressure and 20° C.) of air per hour being passed into the molten polyethylene. The agitator output is 2 kw. and 3.7 kg. of oxygen is absorbed by the melt. A yellowish colored wax is obtained which has the acid number 25.2, the melting point 96° C. and the melt viscosity 520 centistokes.

*Example 6*

50 kg. of polyethylene having the molecular weight 5,500 at 160° C. is oxidized in the apparatus described in Example 5 at an impeller speed of 1400 r.p.m. for 1¾ hours at a pressure of 11 atmospheres. 10,000 liters (measured at standard pressure and 20° C.) per hour of air is led into the melt. The agitator output is 5 kw./100 kg. and a total of 3.9 kg. of oxygen is absorbed by the melt. A wax is obtained which has the acid number 22.5, the melting point 94° to 96° C. and the melt viscosity 691.5 centistokes. It is suitable for the production of dry-bright wax emulsions.

*Example 7*

50 kg. of polyethylene having the properties specified in Examples 1 to 4 is heated to 160° to 162° C. in a 100-l. pressure vessel provided with a turbine impeller, baffles, cooler and water separator. The turbine impeller has six impeller blades and the ratio of the free diameter of the pressure vessel to the diameter of the turbine impeller is 356:210. 12,000 liters (measured at standard pressure and 20° C.) of air is passed per hour into the resultant polyethylene melt for 2¼ hours at 6 atmospheres with stirring (900 r.p.m.). The agitator output is 5 kw./100 kg. and the polyethylene absorbs a total of 4.25 kg. of oxygen. A practically colorless wax is obtained which has the acid number 30.8, the melting point 95° C. and the melt viscosity 597 centistokes. It is readily emulsifiable in water with the addition of ethenoxylated fatty alcohols, and a wax emulsion is obtained which is entirely stable. It is suitable as a floor polish.

*Example 8*

50 kg. of polyethylene having the properties specified in Examples 1 to 4, is heated to 160° C. in a 100-l. pressure vessel fitted with a turbine impeller, baffles, cooler and water separator. The ratio of the free diameter of the pressure vessel to the diameter of the turbine impeller, which has six impeller blades, is 356:250. 8000 liters (measured at standard pressure and 20° C.) of air is passed per hour into the molten polyethylene at a pressure of 13 atmospheres while stirring at the rate of 700 r.p.m. The agitator output is 5.5 kw./100 kg. and a total of 4.1 kg. of oxygen is absorbed by the melt during the two hour oxidation. A practically colorless wax is obtained which has the acid number 25.2, the melting point 95° to 97° C. and the melt viscosity 512 centistokes.

By working in the same pressure vessel and with the same impeller, and by using the same amount of polyethylene while passing in 10,000 liters (measured at standard pressure and 20° C.) per hour of air and oxidizing at 160° C. and a pressure of 11 atmospheres with an agitator speed of 300 r.p.m. and an agitator output of only 0.8 kw./100 kg., a yellow colored wax is obtained after five hours which has the acid number 23.8, the melting point 96° to 98° C. and a melt viscosity of about 1450 centistokes.

*Examples 9 to 13*

4 kg. of polyethylene having the molecular weight 5700 and a melt viscosity of 1048 centistokes, which has been obtained by thermal degradation of low pressure polyethylene by a conventional method is oxidized in the apparatus described in Examples 1 to 4. The agitator speed is 1000 r.p.m. The whole is heated to 158° C. and, while stirring, 1500 liters per hour (measured at standard pressure and 20° C.) of air is passed into the molten polyethylene at a pressure of 6 atmospheres. Reaction sets in after a few minutes. Stirring is carried out with an output of 7.2 kw./100 kg. for two hours at about 160° C., 0.32 kg. of oxygen being absorbed. The reaction product is a practically colorless wax which melts at 114° to 116° C., has the acid number 21.0 and the melt viscosity 896.8 centistokes.

By working under the same conditions but carrying on the oxidation for 3, 3¾, 4½ or 5¼ hours, 0.5, 0.71, 0.84 or 1.0 kg. of oxygen is absorbed and waxes are obtained having the acid numbers 30.8, 47.6, 60.2 or 66.0, melting points of 112° to 114° C., 107° to 109° C., 101° to 103° C. or 97° to 99° C., and melt viscosities of 644.3, 547.1, 431.6 or 405.0 centistokes. These products have greater hardness than the waxes prepared according to Examples 1 to 8.

*Example 14*

250 kg. of polyethylene having the properties specified in Examples 1 to 4 is introduced into a 500-l. pressure vessel of corrosion-resistant steel fitted with baffles, cooling coils, turbine impeller and water separator, and heated to 155° C. The turbine impeller has six blades and the ratio of the free diameter of the pressure vessel to the diameter of the impeller is 175:100. The polyethylene melt is oxidized with intense agitation at the rate of 420 r.p.m. and with an agitator output of 4 kw./100 kg. at a pressure of 13 atmospheres for 80 minutes, 110,000 liters per hour of air being passed into the molten polyethylene. The temperature is prevented by cooling from exceeding 160° C. A practically colorless wax is obtained having the acid number 30.2 and the melt viscosity 357 centistokes.

*Example 15*

5 kg. of a copolymer of ethylene and carbon monoxide (molecular weight 6000), which contains 50 ethylene groups to one carbonyl group and which has a melt viscosity of 870, is oxidized as described in Example 1 with an agitator output of 9.6 kw./100 kg. for 40 minutes, a total of 0.07 kg. of oxygen being absorbed.

The wax thus obtained is practically colorless, melts at 111° C. to 112° C., has the acid number 11.2 and a melt viscosity of 766 centistokes. This wax may be emulsified particularly readily.

Example 16

4 kg. of polypropylene having the molecular weight 40,000 and a melt viscosity (at 190° C.) of 13,000, which has been prepared in the conventional way by thermal degradation of a polypropylene having a molecular weight of more than $10^6$, is placed in a 10-l. pressure vessel of corrosion-resistant steel fitted with baffles, a turbine impeller, cooler and water separator. The ratio of the free diameter of the pressure vessel to the diameter of the turbine impeller used (having six blades) is 20:13. The whole is heated to 185° C. and then 1800 liters per hour (measured at standard pressure and 20° C.) of air is passed into the molten polypropylene while stirring (450 r.p.m.) at a pressure of 11 atmospheres. Reaction sets in after a few minutes. Stirring is continued for thirty minutes at about 195° C. and an agitator output of 1 kw./100 kg. A total of 0.12 kg. of oxygen is absorbed. The reaction product obtained is a practically colorless wax having the acid number 1.1, the saponification number 5.2, and a melt viscosity (at 190° C.) of 700 centistokes. It is readily emulsifiable.

If the oxidation is not stopped until after fifty minutes, the reaction product obtained is an emulsifiable wax having the acid number 1.3, the saponification number 5.6 and a melt viscosity (at 155° C.) of 196 centistokes.

Example 17

4 kg. of polypropylene having the molecular weight 34,500 is oxidized in the way described in Example 16 at a pressure of 15 atmospheres at 205° C. for an hour by passing in 1500 liters of air. The wax obtained has the acid number 1.4, saponification number 7.0 and a melt viscosity (at 155° C.) of 154 centistokes. The wax is readily emulsifiable.

Example 18

4 kg. of polypropylene having the molecular weight 40,000 is oxidized as described in Example 16 with 2000 liters of air during an oxidation period of 2½ hours. The oxidation product obtained is a readily emulsifiable wax having the acid number 15.4, the saponification value 35.8 and a melt viscosity (at 155° C.) of 57 centistokes.

What we claim is:

1. A process for the production of emulsifiable waxes which consists essentially of: contacting molten polyethylene having a molecular weight of between 1,000 and 50,000 with an oxidizing gas selected from the group consisting of oxygen and gases containing oxygen under increased pressure and at temperatures between 130° C. and 250° C.; and continuing the oxidation until 0.5 to 10 kg. oxygen has been absorbed for each 100 kg. of the polyethylene, said oxidation being carried out under intense agitation with an agitator output of from 1 to 15 kilowatts being utilized per 100 kg. of the polyethylene.

2. A process as claimed in claim 1 wherein polyethylene having a molecular weight of between 3,000 and 10,000 is used and the oxidation is carried out at temperatures between 130° C. and 180° C.

References Cited by the Examiner

UNITED STATES PATENTS

| | | | |
|---|---|---|---|
| 2,828,296 | 3/1958 | Guillet | 260—94.9 |
| 2,911,384 | 11/1959 | Thompson et al. | 260—94.9 |
| 2,928,816 | 3/1960 | Chapman et al. | 260—94.9 |

JOSEPH L. SCHOFER, *Primary Examiner.*

E. M. OLSTEIN, J. A. SEIDLECK, *Assistant Examiners.*